US011475431B2

(12) United States Patent
Ruder et al.

(10) Patent No.: US 11,475,431 B2
(45) Date of Patent: Oct. 18, 2022

(54) TRANSACTION PROCESSING BY MULTIPLE DEVICES

(71) Applicant: Block, Inc., San Francisco, CA (US)

(72) Inventors: Edward Ruder, San Jose, CA (US); James Puls, San Francisco, CA (US); Mehdi Mulani, San Francisco, CA (US); Shawn Morel, San Francisco, CA (US); Grace Chen, San Francisco, CA (US); Christopher R. Clark, San Francisco, CA (US); J. Bryan Scott, San Francisco, CA (US); Eric Monti, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 16/681,217

(22) Filed: Nov. 12, 2019

(65) Prior Publication Data

US 2020/0082376 A1 Mar. 12, 2020

Related U.S. Application Data

(63) Continuation of application No. 13/797,390, filed on Mar. 12, 2013, now Pat. No. 10,496,977.

(Continued)

(51) Int. Cl.
*G06Q 20/32* (2012.01)
*G06Q 20/40* (2012.01)
*G06Q 20/12* (2012.01)

(52) U.S. Cl.
CPC ........... *G06Q 20/322* (2013.01); *G06Q 20/12* (2013.01); *G06Q 20/3223* (2013.01); *G06Q 20/4016* (2013.01)

(58) Field of Classification Search
CPC .. G06Q 20/202; G06Q 20/4016; G06Q 20/20; G06Q 20/3278; G06Q 30/0268; G07F 7/0886; G07F 7/127
See application file for complete search history.

(56) References Cited

U.S. PATENT DOCUMENTS 5,692,233 A 11/1997 Garman
5,778,173 A 7/1998 Apte
(Continued)

FOREIGN PATENT DOCUMENTS

CA 2 879 290 A1 1/2014
CA 2 903 983 A1 9/2014
(Continued)

OTHER PUBLICATIONS

Q. Li, X. Zhang, J. Seifert and H. Zhong, "Secure Mobile Payment via Trusted Computing," 2008 Third Asia-Pacific Trusted Infrastructure Technologies Conference, 2008, pp. 98-112 (Year: 2008).*
(Continued)

*Primary Examiner* — Mohammad Z Shaikh
(74) *Attorney, Agent, or Firm* — Lee & Hayes, P.C.

(57) ABSTRACT

Techniques associated with a customer-facing device and a merchant-facing device are described herein. In an example, a system can include a customer-facing device configured with a customer application that is executable on an operating system of the customer-facing device to (i) display information to a customer and (ii) receive input from the customer, wherein the customer-facing device includes a payment reader to read payment data from a payment instrument in association with a payment transaction between the customer and a merchant, and a merchant-facing device configured with a merchant application that is executable on an operating system of the merchant-facing device to (i) display information to the merchant and (ii) receive input from the merchant. In at least one example, the
(Continued)

customer-facing device and the merchant-facing device can communicate to process, at least in part, the payment transaction associated with the payment instrument via a remote payment service system.

20 Claims, 8 Drawing Sheets

Related U.S. Application Data

(60) Provisional application No. 61/672,228, filed on Jul. 16, 2012.

(56) References Cited

U.S. PATENT DOCUMENTS

| | | | |
|---|---|---|---|
| 5,892,900 A | 4/1999 | Ginter et al. | |
| 6,096,096 A | 8/2000 | Murphy et al. | |
| 6,259,672 B1 | 7/2001 | Lohrbach | |
| 6,328,208 B1 | 12/2001 | Artino et al. | |
| 6,603,487 B1 | 8/2003 | Bennett et al. | |
| 6,693,897 B1 | 2/2004 | Huang | |
| 6,725,444 B2 | 4/2004 | Fergus | |
| 6,879,965 B2 * | 4/2005 | Fung | G06Q 20/10 235/379 |
| 6,975,717 B1 | 12/2005 | Smith et al. | |
| 6,980,638 B1 | 12/2005 | Smith et al. | |
| 7,092,380 B1 | 8/2006 | Chen et al. | |
| 7,096,003 B2 | 8/2006 | Joao et al. | |
| 7,225,156 B2 | 5/2007 | Fisher et al. | |
| 7,466,689 B1 | 12/2008 | Halpern et al. | |
| 7,478,266 B2 | 1/2009 | Gatto et al. | |
| 7,610,040 B2 | 10/2009 | Cantini et al. | |
| 7,818,811 B2 * | 10/2010 | Kirovski | G06Q 20/06 705/52 |
| 7,835,942 B1 | 11/2010 | Pavlic et al. | |
| 7,853,525 B2 | 12/2010 | Yeates et al. | |
| 7,865,400 B2 * | 1/2011 | Rogers | G06Q 30/0633 705/26.8 |
| 7,866,546 B1 | 1/2011 | Vance | |
| 7,962,418 B1 | 6/2011 | Wei et al. | |
| 7,983,423 B1 | 7/2011 | Agarwal et al. | |
| 8,041,338 B2 | 10/2011 | Chen et al. | |
| 8,090,654 B2 * | 1/2012 | Ward | G06Q 20/10 705/40 |
| 8,121,945 B2 * | 2/2012 | Rackley, III | G06Q 20/042 235/380 |
| 8,223,951 B1 | 7/2012 | Edelhaus et al. | |
| 8,224,709 B2 | 7/2012 | Hirson | |
| 8,297,501 B1 * | 10/2012 | Kowalchyk | G06Q 20/102 235/380 |
| 8,341,084 B2 * | 12/2012 | Cowen | G06Q 20/105 705/41 |
| 8,378,485 B2 * | 2/2013 | Bachman | H01L 21/4867 257/737 |
| 8,380,177 B2 * | 2/2013 | Laracey | G06Q 30/0253 455/414.1 |
| 8,396,808 B2 | 3/2013 | Greenspan | |
| 8,452,704 B2 | 5/2013 | Barbara et al. | |
| 8,494,478 B1 | 7/2013 | Ponnangath | |
| 8,499,355 B1 | 7/2013 | Goncharov | |
| 8,543,496 B2 * | 9/2013 | Beenau | G06Q 20/108 705/39 |
| 8,608,064 B2 | 12/2013 | Xu et al. | |
| 8,626,579 B2 * | 1/2014 | Fordyce, III | G06Q 20/10 705/14.1 |
| 8,635,354 B2 | 1/2014 | Martino et al. | |
| 8,660,911 B2 | 2/2014 | Hirson et al. | |
| 8,694,438 B1 | 4/2014 | Jernigan et al. | |
| 8,724,815 B1 | 5/2014 | Roth et al. | |
| 8,868,859 B2 | 10/2014 | Schmidt et al. | |
| 8,964,533 B2 | 2/2015 | Moore et al. | |
| 9,037,491 B1 | 5/2015 | Lee | |
| 9,281,945 B2 | 3/2016 | Voice et al. | |
| 9,466,055 B2 | 10/2016 | Kulasooriya et al. | |
| 9,741,035 B1 | 8/2017 | White et al. | |
| 9,875,493 B2 | 1/2018 | Nuzzi | |
| 9,881,302 B1 | 1/2018 | White et al. | |
| 9,911,110 B2 | 3/2018 | Scott et al. | |
| 9,911,154 B2 * | 3/2018 | Baker | G06Q 20/105 |
| 10,002,198 B2 | 6/2018 | Felt et al. | |
| 10,037,517 B1 | 7/2018 | Chi et al. | |
| 10,037,521 B1 | 7/2018 | Botros et al. | |
| 10,055,721 B1 | 8/2018 | Mocko et al. | |
| 10,055,722 B1 | 8/2018 | Chen et al. | |
| 10,147,077 B2 * | 12/2018 | Mestre | G06Q 20/20 |
| 10,217,110 B1 | 2/2019 | Chen et al. | |
| 10,366,378 B1 | 7/2019 | Han et al. | |
| 10,467,618 B2 * | 11/2019 | White | G06Q 20/3226 |
| 10,496,977 B2 | 12/2019 | Ruder et al. | |
| 10,523,767 B2 * | 12/2019 | Ewe | H04L 67/145 |
| 2001/0019614 A1 | 9/2001 | Madoukh | |
| 2001/0051920 A1 | 12/2001 | Joao et al. | |
| 2002/0016769 A1 | 2/2002 | Barbara et al. | |
| 2002/0026374 A1 | 2/2002 | Moneymaker et al. | |
| 2002/0055909 A1 * | 5/2002 | Fung | G06Q 20/10 705/42 |
| 2002/0132662 A1 | 9/2002 | Sharp et al. | |
| 2002/0156727 A1 | 10/2002 | LeVake et al. | |
| 2002/0194137 A1 | 12/2002 | Park et al. | |
| 2002/0194590 A1 | 12/2002 | Pong | |
| 2003/0005251 A1 | 1/2003 | Wilson et al. | |
| 2003/0009382 A1 | 1/2003 | D'Arbeloff et al. | |
| 2003/0046235 A1 | 3/2003 | Lacivita et al. | |
| 2003/0065556 A1 * | 4/2003 | Takanashi | G08G 1/202 705/13 |
| 2003/0105688 A1 | 6/2003 | Brown et al. | |
| 2003/0120608 A1 | 6/2003 | Pereyra | |
| 2003/0191709 A1 | 10/2003 | Elston et al. | |
| 2003/0204560 A1 | 10/2003 | Chen et al. | |
| 2003/0212660 A1 | 11/2003 | Kerwin | |
| 2003/0222138 A1 * | 12/2003 | Oppenlander | G06Q 20/10 235/380 |
| 2003/0225883 A1 | 12/2003 | Greaves et al. | |
| 2003/0229793 A1 | 12/2003 | McCall et al. | |
| 2004/0015954 A1 | 1/2004 | Tuerke et al. | |
| 2004/0034684 A1 | 2/2004 | Payne | |
| 2004/0088737 A1 | 5/2004 | Donlan et al. | |
| 2004/0107356 A1 | 6/2004 | Shamoon et al. | |
| 2004/0112959 A1 * | 6/2004 | Jun | G07B 13/04 235/384 |
| 2004/0122685 A1 | 6/2004 | Bunce | |
| 2004/0158510 A1 | 8/2004 | Fisher | |
| 2004/0168055 A1 | 8/2004 | Lord et al. | |
| 2004/0210519 A1 | 10/2004 | Oppenlander et al. | |
| 2004/0210566 A1 | 10/2004 | Smith et al. | |
| 2004/0215560 A1 | 10/2004 | Amalraj et al. | |
| 2005/0033688 A1 | 2/2005 | Peart et al. | |
| 2005/0134683 A1 | 6/2005 | Quintana et al. | |
| 2005/0149455 A1 | 7/2005 | Bruesewitz et al. | |
| 2005/0187873 A1 * | 8/2005 | Labrou | G07F 7/1008 705/40 |
| 2005/0279827 A1 | 12/2005 | Mascavage et al. | |
| 2006/0031466 A1 | 2/2006 | Kovach | |
| 2006/0034255 A1 | 2/2006 | Benning et al. | |
| 2006/0036134 A1 | 2/2006 | Tarassenko et al. | |
| 2006/0036541 A1 | 2/2006 | Schleicher | |
| 2006/0039290 A1 | 2/2006 | Roden et al. | |
| 2006/0059268 A1 | 3/2006 | Victor et al. | |
| 2006/0123088 A1 | 6/2006 | Simmons et al. | |
| 2006/0143239 A1 | 6/2006 | Battat et al. | |
| 2006/0218228 A1 | 9/2006 | Mouline | |
| 2006/0253338 A1 | 11/2006 | Metzger | |
| 2006/0277111 A1 | 12/2006 | Bevis | |
| 2007/0051794 A1 | 3/2007 | Glanz et al. | |
| 2007/0106558 A1 | 5/2007 | Mitchell et al. | |
| 2007/0194110 A1 | 8/2007 | Esplin et al. | |
| 2007/0194113 A1 | 8/2007 | Esplin et al. | |
| 2007/0223408 A1 | 9/2007 | Thielke et al. | |
| 2007/0255617 A1 | 11/2007 | Maurone et al. | |
| 2007/0262139 A1 | 11/2007 | Fiebiger et al. | |
| 2007/0266130 A1 * | 11/2007 | Mazur | G06Q 20/12 709/223 |

(56) References Cited

U.S. PATENT DOCUMENTS

| | | | |
|---|---|---|---|
| 2007/0274291 A1 | 11/2007 | Diomelli | |
| 2007/0280288 A1 | 12/2007 | Ma | |
| 2008/0035725 A1 | 2/2008 | Jambunathan et al. | |
| 2008/0052233 A1 | 2/2008 | Fisher et al. | |
| 2008/0091944 A1 | 4/2008 | von Mueller et al. | |
| 2008/0097851 A1 | 4/2008 | Bemmel et al. | |
| 2008/0126213 A1 | 5/2008 | Robertson et al. | |
| 2008/0133419 A1 | 6/2008 | Wormington et al. | |
| 2008/0183621 A1 | 7/2008 | Evans | |
| 2008/0189186 A1 | 8/2008 | Choi et al. | |
| 2008/0203151 A1 | 8/2008 | Dixon et al. | |
| 2008/0203170 A1 | 8/2008 | Hammad et al. | |
| 2008/0208681 A1 | 8/2008 | Hammad et al. | |
| 2008/0219453 A1 | 9/2008 | Chang et al. | |
| 2008/0223918 A1 | 9/2008 | Williams et al. | |
| 2008/0270302 A1 | 10/2008 | Beenau et al. | |
| 2008/0275760 A1 | 11/2008 | Easterly et al. | |
| 2008/0283590 A1 | 11/2008 | Oder, II et al. | |
| 2008/0283592 A1 | 11/2008 | Oder II, et al. | |
| 2009/0004998 A1 | 1/2009 | Aaron | |
| 2009/0030885 A1 | 1/2009 | DePasquale et al. | |
| 2009/0063339 A1 | 3/2009 | Santora | |
| 2009/0094123 A1* | 4/2009 | Killian | G06Q 20/0855 705/16 |
| 2009/0164375 A1 | 6/2009 | Saunders et al. | |
| 2009/0210299 A1 | 8/2009 | Cowen | |
| 2009/0245268 A1 | 10/2009 | Pugliese, IV | |
| 2009/0248555 A1 | 10/2009 | Sada et al. | |
| 2009/0307778 A1* | 12/2009 | Mardikar | H04L 63/0861 726/26 |
| 2010/0021049 A1 | 1/2010 | Nikaido | |
| 2010/0029265 A1 | 2/2010 | Khandekar et al. | |
| 2010/0031049 A1 | 2/2010 | Shima et al. | |
| 2010/0057612 A1 | 3/2010 | Wagenhals | |
| 2010/0114744 A1 | 5/2010 | Gonen | |
| 2010/0121726 A1 | 5/2010 | Coulter et al. | |
| 2010/0169284 A1 | 7/2010 | Walter et al. | |
| 2010/0211469 A1 | 8/2010 | Salmon et al. | |
| 2010/0267390 A1 | 10/2010 | Lin et al. | |
| 2010/0293099 A1 | 11/2010 | Pauker et al. | |
| 2010/0299212 A1* | 11/2010 | Graylin | G06Q 20/326 705/26.7 |
| 2010/0299220 A1 | 11/2010 | Baskerville et al. | |
| 2010/0305993 A1 | 12/2010 | Fisher | |
| 2010/0312617 A1 | 12/2010 | Cowen | |
| 2010/0317318 A1 | 12/2010 | Carter et al. | |
| 2010/0318446 A1 | 12/2010 | Carter | |
| 2010/0325039 A1 | 12/2010 | Radu et al. | |
| 2010/0327056 A1 | 12/2010 | Yoshikawa et al. | |
| 2010/0332351 A1 | 12/2010 | Stone | |
| 2011/0016041 A1 | 1/2011 | Scragg | |
| 2011/0016043 A1 | 1/2011 | Dornseif | |
| 2011/0016054 A1 | 1/2011 | Dixon et al. | |
| 2011/0035278 A1* | 2/2011 | Fordyce, III | G06Q 20/10 705/14.49 |
| 2011/0035294 A1 | 2/2011 | Mizrah | |
| 2011/0039585 A1* | 2/2011 | Rouse | G06Q 20/102 705/40 |
| 2011/0082798 A1 | 4/2011 | Michaud et al. | |
| 2011/0084140 A1 | 4/2011 | Wen | |
| 2011/0106936 A1 | 5/2011 | Galbreath et al. | |
| 2011/0125566 A1 | 5/2011 | McLaughlin et al. | |
| 2011/0126060 A1 | 5/2011 | Grube et al. | |
| 2011/0128954 A1 | 6/2011 | Veenstra et al. | |
| 2011/0131122 A1 | 6/2011 | Griffin et al. | |
| 2011/0153453 A1* | 6/2011 | Ghafoor | G06Q 10/02 705/26.9 |
| 2011/0154497 A1 | 6/2011 | Bailey, Jr. | |
| 2011/0161233 A1 | 6/2011 | Tieken | |
| 2011/0166936 A1 | 7/2011 | Dixon et al. | |
| 2011/0166997 A1 | 7/2011 | Dixon et al. | |
| 2011/0196791 A1 | 8/2011 | Dominguez | |
| 2011/0238473 A1 | 9/2011 | Sankolli et al. | |
| 2011/0238510 A1 | 9/2011 | Rowen et al. | |
| 2011/0270761 A1 | 11/2011 | Graham, III et al. | |
| 2011/0313925 A1 | 12/2011 | Bailey, Jr. | |
| 2012/0016731 A1* | 1/2012 | Smith | G06Q 20/20 705/14.33 |
| 2012/0036076 A1 | 2/2012 | Vanderwall et al. | |
| 2012/0072347 A1 | 3/2012 | Conway | |
| 2012/0078789 A1 | 3/2012 | Harrell | |
| 2012/0084210 A1* | 4/2012 | Farahmand | G06Q 40/02 705/64 |
| 2012/0095855 A1* | 4/2012 | Sterling | G06Q 30/0613 705/16 |
| 2012/0101822 A1 | 4/2012 | Dinerstein | |
| 2012/0109802 A1 | 5/2012 | Griffin et al. | |
| 2012/0144461 A1 | 6/2012 | Rathbun | |
| 2012/0150601 A1* | 6/2012 | Fisher | H04W 4/21 705/14.23 |
| 2012/0166311 A1 | 6/2012 | Dwight et al. | |
| 2012/0191522 A1 | 7/2012 | McLaughlin et al. | |
| 2012/0191569 A1* | 7/2012 | Shah | G06Q 30/0613 705/26.41 |
| 2012/0191610 A1* | 7/2012 | Prasad | G06Q 20/40 705/44 |
| 2012/0209771 A1 | 8/2012 | Winner et al. | |
| 2012/0233005 A1 | 9/2012 | White | |
| 2012/0239556 A1 | 9/2012 | Magruder et al. | |
| 2012/0265697 A1 | 10/2012 | Tuchman et al. | |
| 2012/0271765 A1 | 10/2012 | Cervenka et al. | |
| 2012/0284130 A1 | 11/2012 | Lewis et al. | |
| 2012/0284187 A1 | 11/2012 | Hammad et al. | |
| 2012/0290376 A1* | 11/2012 | Dryer | G06Q 20/385 705/14.23 |
| 2012/0303425 A1* | 11/2012 | Katzin | G06Q 20/4016 705/16 |
| 2012/0310831 A1 | 12/2012 | Harris et al. | |
| 2012/0330845 A1* | 12/2012 | Kang | G06Q 40/02 705/71 |
| 2013/0006872 A1* | 1/2013 | Chandoor | H04L 9/3215 705/75 |
| 2013/0054465 A1 | 2/2013 | Sakata et al. | |
| 2013/0091042 A1 | 4/2013 | Shah et al. | |
| 2013/0138563 A1 | 5/2013 | Gilder et al. | |
| 2013/0144701 A1 | 6/2013 | Kulasooriya et al. | |
| 2013/0151405 A1 | 6/2013 | Head et al. | |
| 2013/0159191 A1 | 6/2013 | Maiya et al. | |
| 2013/0173407 A1* | 7/2013 | Killian | G06Q 20/0855 705/21 |
| 2013/0179281 A1* | 7/2013 | White | G06Q 20/382 705/21 |
| 2013/0179352 A1* | 7/2013 | Dwyre | G06Q 20/20 705/71 |
| 2013/0185124 A1* | 7/2013 | Aaron | G07B 13/00 705/13 |
| 2013/0185152 A1* | 7/2013 | Aaron | G06Q 20/02 709/219 |
| 2013/0185208 A1* | 7/2013 | Aaron | G07B 15/02 705/44 |
| 2013/0198075 A1 | 8/2013 | Sakata et al. | |
| 2013/0198081 A1* | 8/2013 | Royyuru | G06Q 20/322 705/44 |
| 2013/0238431 A1 | 9/2013 | Kulasooriya et al. | |
| 2013/0246171 A1* | 9/2013 | Carapelli | G06Q 20/3278 705/14.51 |
| 2013/0246187 A1 | 9/2013 | Chau et al. | |
| 2013/0262307 A1 | 10/2013 | Fasoli et al. | |
| 2013/0268337 A1 | 10/2013 | Morello | |
| 2013/0346175 A1 | 12/2013 | Muthu | |
| 2013/0346244 A1 | 12/2013 | Nuzzi | |
| 2014/0006194 A1 | 1/2014 | Xie et al. | |
| 2014/0008432 A1* | 1/2014 | de Geer | G06Q 20/322 235/379 |
| 2014/0019274 A1* | 1/2014 | Hardin | G06Q 20/20 705/21 |
| 2014/0025581 A1* | 1/2014 | Calman | G06Q 20/3223 705/65 |
| 2014/0025958 A1 | 1/2014 | Caiman | |
| 2014/0032415 A1* | 1/2014 | Lee | G06Q 20/20 705/44 |

(56) References Cited

U.S. PATENT DOCUMENTS

| | | |
|---|---|---|
| 2014/0032470 A1 | 1/2014 | McCarthy et al. |
| 2014/0098671 A1 | 4/2014 | Raleigh et al. |
| 2014/0114853 A1 | 4/2014 | Guedj |
| 2014/0156534 A1 | 6/2014 | Quigley et al. |
| 2014/0172680 A1 | 6/2014 | Prabhu |
| 2015/0081462 A1 | 3/2015 | Ozvat et al. |
| 2015/0095453 A1 | 4/2015 | Jain et al. |
| 2015/0170132 A1 | 6/2015 | Patel |
| 2015/0229623 A1 | 8/2015 | Grigg et al. |
| 2015/0278795 A1 | 10/2015 | Jiang et al. |
| 2015/0339660 A1 | 11/2015 | Meng et al. |
| 2015/0348040 A1 | 12/2015 | Bhorania et al. |
| 2015/0371216 A1 | 12/2015 | Olawale et al. |
| 2016/0007240 A1 | 1/2016 | Belghoul et al. |
| 2016/0019728 A1* | 1/2016 | Petrie ............... G07B 15/02 705/5 |
| 2016/0094497 A1 | 3/2016 | Javed et al. |
| 2016/0110718 A1 | 4/2016 | Jajara et al. |
| 2016/0335618 A1 | 11/2016 | Koh et al. |
| 2018/0357627 A1 | 12/2018 | Chen et al. |
| 2020/0356992 A1 | 11/2020 | Quigley et al. |

FOREIGN PATENT DOCUMENTS

| | | | |
|---|---|---|---|
| WO | 02/37219 A2 | 5/2002 | |
| WO | WO 2013/034953 * | 9/2011 | ............. G06Q 50/00 |
| WO | WO 2013/036199 * | 9/2011 | ............. G06Q 50/30 |
| WO | 2012/037971 A1 | 3/2012 | |
| WO | 2013/034953 A1 | 3/2013 | |
| WO | WO 2013/034953 * | 3/2013 | ............. G06Q 50/00 |
| WO | 2014/014781 A1 | 1/2014 | |
| WO | 2014/089288 A1 | 6/2014 | |
| WO | 2014/138109 A1 | 9/2014 | |

OTHER PUBLICATIONS

Y. Labrou, J. Agre, L. Ji, J. Molina and W. .-I. Chen, "Wireless wallet," The First Annual International Conference on Mobile and Ubiquitous Systems: Networking and Services, 2004. MOBIQUITOUS 2004., 2004, pp. 32-41, (Year: 2004).*
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
Conkling, C., "General Credit Card (CC) Approval/Payment Process," Figure 2, dated Jan. 17, 2011, Retrieved from the Internet: URL<http:/ /craigconkling. blogspot.com/2011/01/nfc-and-mobile-payment-initiative-4.html>, on Jun. 6, 2014, p. 1-1.
Conkling, C., "Mobile Trends Insight: NFC and the Mobile Payment Initiative-4," dated Jan. 17, 2011, Retrieved from the Internet URL: http:/ /craigconkling. blogspot.com/2011/01/nfc-and-mobile-payment-initiative-4.html, on Jun. 6, 2014, pp. 1-15.
Cooper, D , et al., "Internet X 509 Public Key Infrastructure Certificate and Certificate Revocation List (CRL) Profile," Standards Track, pp. 1-151 (May 2008).
"Cryptography—PCI Encryption Key Management—Information Security Stack Exchange," published Jan. 1, 2011, XP055415553, Retrieved from the Internet URL: https://security.stackexchange.com/questions/1412/pci-encryptionkey-management. Retrieved on Oct. 13, 2017, pp. 1-3.
Denniswi, "How Can I change the Offline Mode Password in Microsoft Dynamice POS 2009?," Microsoft Dynamics, dated Nov. 8, 2011, Retrieved from the Internet URL: <https://community.dynamics.eom/f/31/t/66698.aspx>, on Jun. 4, 2014, p. 1-1.
Evans, D. L., et al., "Security Requirements for Cryptographic Modules," FIPS PUB 140-2 Change Notices, pp. 1-69 (May 25, 2001).
Ferguson, R.B., "Passenger Hacks NYC computer system; The problem is more significant than GPS objections, according to the software engineer who hacked the system," eWeek, dated Dec. 28, 2007, Retrieved from the Internet URL: http://search.pro quest.com/printviewfile?accountid=14753, on Apr. 24, 2017, pp. 1-2.
"MasterCard and VeriFone Bring 'Tap & Go' Payments to Taxis," Wireless News, dated Nov. 15, 2006, Retrieved from the Internet URL: http://search proquest.com/printviewfile?accountid=14753, on Apr. 24, 2017, pp. 1-2.
"Mobile payment," Wikipedia, dated Jul. 9, 2012. Retrieved from the Internet URL: https://en.wikipedia.org/w/index.php?title=Mobile_payment&oldid=501410747,on Feb. 27, 2018, pp. 1-8.
"Offline DB Support for POS," Stack Overflow, dated Jan. 24, 2013, Retrieved from the Internet URL: <http://stackoverflow.com/questions/14495935/offline-dbsupport-for-pos>, on Jun. 4, 2014, p. 1-2.
"Payment Card Industry (PCI) Hardware Security Module (HSM)," Security Requirements Version 1.0, XP055168869, pp. 1-26 (Apr. 2009).
Perez, S., "Revel Systems Debuts An iPad Point-Of- Sale In A Box," TechCrunch, dated Jun. 1, 2012, Retrieved from the Internet URL: <http://techcrunch.com/2012/06/27/revel-systems-debuts-an-ipad-point-of-sale-in-a-box>, on Jun. 4, 2014, pp. 1-5.
"PCI DSS compliant Key Management," published Jul. 31, 2011, XP055415555, Retrieved from the Internet URL: http://www.src-gmbh.de/pcinews/download/PCIWhitepaper-2011-07.pdf, on Oct. 13, 2017, pp. 1-3.
"Suncorp and live TaxiEpay to provider Mobile Payment Terminals for Hypercom," Anonymous Wireless News, dated Jun. 20, 2010, Retrieved from the Internet URL: http://search.pro quest. com/printviewfile?accountid=14753, on Apr. 21, 2017, pp. 1-2.
Tanenbaum, A. S., "Distributed Systems: Principles and Paradigms (2nd Edition)," Pearson Prentice Hall, pp. 273-320 (2007).
"What is 'Offline Mode' and How Does It Work?," Vend, dated Dec. 20, 2011, Retrieved from the Internet URL: <http://support.vendhq.com/hc/enus/articles/201379940-What -is-Offline-Mode-and-how-does-it-work>, on Jun. 4, 2014, pp. 1-3.
"What is the Purpose of Retail Offline Sync Service and How Does It Work?," Microsoft Dynamics, dated Apr. 12, 2012, Retrieved from the Internet URL: <http://community.dynamics.eom/ax/f/33/p/77 406/149851.aspx>, on Jun. 4, 2014, p. 1-3.
Third Party Observation submitted, for PCT Application No. PCT/US2013/050345 on May 30, 2014.
Non-Final Office Action dated Jun. 13, 2014, in U.S. Appl. No. 13/786,262, of Scott J.B., et al., filed Mar. 5, 2013.
Non-Final Office Action dated Sep. 9, 2014, for U.S. Appl. No. 14/284,125, of Chen, G.H., et al., filed May 21, 2014.
Non-Final Office Action dated Dec. 19, 2014, in U.S. Appl. No. 13/786,262, of Scott J.B., et al., filed Mar. 5, 2013.
Final Office Action dated Jan. 15, 2015, for U.S. Appl. No. 14/284,125, of Chen, G.H., et al., filed May 21, 2014.
Non-Final Office Action dated Feb. 18, 2015, for U.S. Appl. No. 13/797,390, of Ruder, E., et al., filed Mar. 12, 2013.
Advisory Action dated Mar. 23, 2015, for U.S. Appl. No. 14/284,125, of Chen, G.H., et al., filed May 21, 2014.
Non-Final Office Action dated Jun. 5, 2015, for U.S. Appl. No. 14/284,125, of Chen, G.H., et al., filed May 21, 2014.
Final Office Action dated Aug. 12, 2015, for U.S. Appl. No. 13/797,390, of Ruder, E., et al., filed Mar. 12, 2013.
Non-Final Office Action dated Sep. 11, 2015, for U.S. Appl. No. 13/736,447, of Quigley, O.S.C., et al., filed Jan. 8, 2013.
Non-Final Office Action dated Sep. 11, 2015, in U.S. Appl. No. 13/786,262, of Scott J.B., et al., filed Mar. 5, 2013.
Final Office Action dated Oct. 6, 2015, for U.S. Appl. No. 14/284,125, of Chen, G.H., et al., filed May 21, 2014.
Examiner's Requisition for Canadian Patent Application No. 2,879,290, mailed Nov. 9, 2015.
Final Office Action dated Mar. 24, 2016, in U.S. Appl. No. 13/786,262, of Scott J.B., et al., filed Mar. 5, 2013.
Non-Final Office Action dated Apr. 21, 2016, for U.S. Appl. No. 14/567,145, of White, M.W., et al., filed Dec. 11, 2014.
Examination Report No. 1 for Australian Patent Application No. 2014225973, dated May 6, 2016.
Advisory Action dated Jun. 1, 2016, in U.S. Appl. No. 13/786,262, of Scott, J.B., et al., filed Mar. 5, 2013.
Examination Report for European Patent Application No. 13859656.4, dated Jun. 22, 2016.

(56) References Cited

OTHER PUBLICATIONS

Office Action for Canadian Patent Application No. 2,892,511, dated Jul. 19, 2016.
Non-Final Office Action dated Jul. 28, 2016, for U.S. Appl. No. 13/797,390, of Ruder, E., et al., filed Mar. 12, 2013.
Non-Final Office Action dated Aug. 16, 2016, for U.S. Appl. No. 14/578,765, of Chi, Y., et al., filed Dec. 22, 2014.
Final Office Action dated Oct. 31, 2016, for U.S. Appl. No. 13/736,447, of Quigley, O.S.C., et al., filed Jan. 8, 2013.
Examination Report for European Patent Application No. 13819366.9, dated Nov. 2, 2016.
Office Action for Canadian Patent Application No. 2,903,983, dated Nov. 4, 2016.
Final Office Action dated Dec. 29, 2016, for U.S. Appl. No. 14/567,145, of White, M.W., et al., filed Dec. 11, 2014.
Examiner's Requisition for Canadian Patent Application No. 2,879,290, mailed Jan. 11, 2017.
Non-Final Office Action dated Feb. 16, 2017, for U.S. Appl. No. 14/274,481, of Chen, G.H., et al., filed May 9, 2014.
Non Final Office Action dated Mar. 3, 2017, for U.S. Appl. No. 14/567,118, of White, M.W., et al., filed Dec. 11, 2014.
Final Office Action dated Mar. 9, 2017, for U.S. Appl. No. 14/578,765, of Chi, Y., et al., filed Dec. 22, 2014.
Notice of Acceptance for Australian Patent Application No. 2014225973, dated Mar. 15, 2017.
Non-Final Office dated Mar. 24, 2017, for U.S. Appl. No. 14/495,390, of Botros, P.A., et al., filed Sep. 24, 2014.
Non-Final Office Action dated Apr. 6, 2017, for U.S. Appl. No. 14/274,524, of Mocko, C.L., et al., filed May 9, 2014.
Final Office Action dated Feb. 20, 2020, for U.S. Appl. No. 13/736,447, of Quigley, O.S.C., et al., filed Jan. 8, 2013.
Non Final Office Action dated Apr. 10, 2020, for U.S. Appl. No. 15/870,562, of White, M.W., et al., filed Jan. 12, 2018.
Notice of Allowance dated Apr. 17, 2017, for U.S. Appl. No. 14/567,145, of White, M.W., et al., filed Dec. 11, 2014.
Final Office Action dated May 9, 2017, for U.S. Appl. No. 13/797,390, of Ruder, E., et al., filed Mar. 12, 2013.
Notice of Allowance for Canadian Patent Application No. 2,892,511, dated May 26, 2017.
Non-Final Office Action dated Jun. 2, 2017, for U.S. Appl. No. 13/786,262, of Scott, J.B., et al., filed on Mar. 5, 2013.
Final Office Action dated Jun. 2, 2017, for U.S. Appl. No. 14/274,481, of Chen, G.H., et al., filed May 9, 2014.
Examination Report for European Patent Application No. 14760487.0, dated Jun. 28, 2017.
Final Office Action dated Jul. 14, 2017, for U.S. Appl. No. 14/495,390, of Botros, P.A., et al., filed Sep. 24, 2014.
Advisory Action dated Sep. 13, 2017, for U.S. Appl. No. 14/274,481, of Chen, G.H., et al., filed May 9, 2014.
Notice of Allowance dated Sep. 15, 2017, for U.S. Appl. No. 14/567,118, of White, M.W., et al., filed Dec. 11, 2014.
Non-Final Office Action dated Oct. 4, 2017, for U.S. Appl. No. 14/578,765, of Chi, Y., et al., filed Dec. 22, 2014.
Notice of Allowance dated Oct. 13, 2017, for U.S. Appl. No. 13/786,262, of Scott, J.B., et al., filed May 3, 2013.
Non-Final Office Action dated Oct. 31, 2017, for U.S. Appl. No. 14/274,481, of Chen, G.H., et al., filed May 9, 2014.
Final Office Action dated Nov. 1, 2017, for U.S. Appl. No. 14/274,524, of Mocko, C.L., et al., filed May 9, 2014.
Summons to attend oral proceedings for European Patent Application No. 13859656.4, mailed Nov. 2, 2017.
Examiner's Requisition for Canadian Patent Application No. 2,903,983, mailed Nov. 6, 2017.
Notice of Allowance for Canadian Patent Application No. 2,879,290, dated Jan. 9, 2018.
Advisory Action dated Jan. 31, 2018, for U.S. Appl. No. 14/274,524, of Mocko, C.L., et al., filed May 9, 2014.
Notification concerning the date of oral proceedings for European Patent Application No. 13819366.9, mailed Mar. 5, 2018.
Notice of Allowance dated Apr. 6, 2018, for U.S. Appl. No. 14/578,765, of Chi, Y., et al., filed Dec. 22, 2014.
Notice of Allowance dated Apr. 9, 2018, for U.S. Appl. No. 14/495,390, of Botros, P.A., et al., filed Sep. 24, 2014.
Notice of Allowance dated Apr. 13, 2018, for U.S. Appl. No. 14/274,524, of Mocko, C.L., et al., filed May 9, 2014.
Notice of Allowance dated Apr. 24, 2018, for U.S. Appl. No. 14/284,125, of Chen, G.H., et al., filed May 21, 2014.
Final Office Action dated May 31, 2018, for U.S. Appl. No. 14/274,481, of Chen, G.H., et al., filed May 9, 2014.
Non-Final Office Action dated Jul. 25, 2018, for U.S. Appl. No. 15/199,466, of Han, K., et al., filed Jun. 30, 2016.
Non-Final Office Action dated Aug. 7, 2018, for U.S. Appl. No. 13/736,447, of Quigley, O.S.C., et al., filed Jan. 8, 2013.
Advisory Action dated Aug. 31, 2018, for U.S. Appl. No. 14/274,481, of Chen, G.H., et al., filed May 9, 2014.
Non-Final Office Action dated Sep. 10, 2018, for U.S. Appl. No. 13/797,390, of Ruder, E., et al., filed Mar. 12, 2013.
Notice of Allowance dated Oct. 22, 2018, for U.S. Appl. No. 14/274,481, of Chen, G.H., et al., filed May 9, 2014.
Notice of Allowance for Canadian Patent Application No. 2,903,983, dated Oct. 24, 2018.
Final Office Action dated Feb. 1, 2019, for U.S. Appl. No. 13/736,447, of Quigley, O.S.C., et al., filed Jan. 8, 2013.
Non Final Office Action dated Feb. 14, 2019, for U.S. Appl. No. 16/105,918, of Chen, G.H., et al., filed Aug. 20, 2018.
Notice of Allowance dated Mar. 13, 2019, for U.S. Appl. No. 15/199,466, of Han, K., et al., filed Jun. 30, 2016.
Final Office Action dated Mar. 21, 2019, for U.S. Appl. No. 13/797,390, of Ruder, E., et al., filed Mar. 12, 2013.
Advisory Action mailed May 24, 2019, for U.S. Appl. No. 13/797,390, of Ruder, E., et al., filed Mar. 12, 2013.
Final Office Action mailed Jun. 17, 2019, for U.S. Appl. No. 16/105,918, of Chen, G.H., etaL, filed Augusi 20,2018.
Notice of Allowance mailed Jul. 3, 2019, for U.S. Appl. No. 13/797,390, of Ruder, E., et al., filed Mar. 12, 2013.
Non Final Office Action mailed Aug. 7, 2019, for U.S. Appl. No. 13/736,447, of Quigley, O.S.C., et al., filed Jan. 8, 2013.
Notice of Allowance mailed Nov. 6, 2019, for U.S. Appl. No. 13/797,390, of Ruder, E., et al., filed Mar. 12, 2013.
Non Final Office Action mailed Dec. 31, 2019, for U.S. Appl. No. 16/105,918, ofChen, G.H., et al., filed Aug. 20, 2018.
International Search Report and Written Opinion for International Patent Application No. PCT/US2013/050345, mailed Oct. 4, 2013.
International Search Report and Written Opinion for International Patent Application No. PCT/US2013/073302, mailed Apr. 18, 2014.
International Search Report and Written Opinion for International Patent Application No. PCT/US2014/020389, mailed Jun. 17, 2014.
Extended European Search Report for European Patent Application No. 13859656.4, mailed on Sep. 4, 2015.
Extended European Search Report for European Patent Application No. 13819366.9 mailed Feb. 19, 2 016.
Extended European Search Report for European Patent Application No. 14760487.0 dated Jul. 7, 2016.
Final Office Action dated Jul. 30, 2019, for U.S. Appl. No. 16/105,918, of Chen, G.H., et al., filed Aug. 20, 2018.
Advisory Action dated Sep. 30, 2020, for U.S. Appl. No. 16/105,918, of Chen, G.H., et al., filed Aug. 20, 2018.
Final Office Action dated Sep. 9, 2020, for U.S. Appl. No. 15/870,562, of White, M.W., et al., filed Jan. 12, 2018.
Zhang et al., "Secure Mobile Payment via Trusted Computing," 2008 Third Asia-Pacific Trusted Infrastructure Technologies Conference, (Year: 2008) pp. 98-112.
Non-Final Office Action dated Nov. 27, 2020, for U.S. Appl. No. 16/105,918, of Chen, G.H., et al., filed Aug. 20, 2018.
Advisory Action dated Nov. 30, 2020, for U.S. Appl. No. 15/870,562, of White, M.W., et al., filed Jan. 12, 2018.
Non-Final Office Action dated May 7, 2021, for U.S. Appl. No. 15/870,562, of White, M.W , et al., filed Jan. 12, 2018.
Final Office Action dated Sep. 15, 2021, for U.S. Appl. No. 15/870,562, of White, M.W., et al., filed Jan. 12, 2018.

(56) References Cited

OTHER PUBLICATIONS

Advisory Action dated Dec. 27, 2021, for U.S. Appl. No. 15/870,562, of White, M.W., et al., filed Jan. 12, 2018.

* cited by examiner

TRANSACTION PROCESSING BY MULTIPLE DEVICES

CROSS REFERENCE TO RELATED APPLICATIONS

This application is a continuation of, and claims priority to, U.S. patent application Ser. No. 13/797,390, filed on Mar. 12, 2013 and issued on Dec. 3, 2019 as U.S. Pat. No. 10,496,977, which claims priority to U.S. Provisional Patent Application No. 61/672,228, filed on Jul. 16, 2012, the entire contents of both of which are hereby incorporated by reference.

TECHNICAL FIELD

This disclosure relates to mobile payment processing using a mobile device.

BACKGROUND

In a conventional point-of-sale electronic credit card transaction, the transaction is authorized and captured over a network connection during the point-of-sale. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture stage can trigger the financial transaction between the card issuer and the merchant, and optionally creates a receipt. There can also be other entities, e.g., the card acquirer, in the route of the transaction. Debit card transactions have a different routing, but also require swiping of the card.

Mobile card readers are available. Some mobile card readers use WiFi technology to communicate with the credit card processor via a wireless network access point. Some mobile card readers, e.g., in taxis, use cellular technology to communicate wirelessly with the credit card processor.

SUMMARY

Although mobile card readers are available, e.g., in taxis, such systems conventionally require an Internet connection to process transactions. However, in some situations, a merchant may be in an area without an Internet connection. For example, a taxi may make a trip to an area with no cellular data network. Therefore, a mobile device can be configured to store a transaction if the mobile device does not have an Internet connection and to forward the transaction to a payment service system when the mobile device reestablishes an Internet connection.

In one aspect, a method of processing a payment transaction using a mobile device of a merchant, comprising determining the mobile device does not have a connection to an external network; receiving data indicating a payment transaction between a customer and the merchant; determining whether the payment transaction should be stored, where the determining is based on a risk heuristic model that considers one or more of the following: a number of already stored transactions, a value of the payment transaction, a total value, where the total value is a sum of the value of the payment transaction and values of one or more already stored transactions, and risk factors associated with the customer; and based at least on the determination, storing the payment transaction on the mobile device for future processing.

Implementations may include one or more of the following. After storing the payment transaction, determining the mobile device has a connection to the external network; determining the mobile device has stored payment transactions; forwarding each of the stored payment transactions to a payment service system; and receiving a response for each of the stored payment transactions from the payment service system. Each response is an acceptance or a rejection of the respective stored payment transaction. The risk heuristic model comprises: determining whether a value of the payment transaction or a total value surpasses a maximum value, where the total value is a sum of the value of the payment transaction and values of one or more already stored transactions; and determining whether a number of stored transactions stored on the mobile device surpasses a maximum number. If the number of stored transactions does not surpass the maximum number and the value of the payment transaction or the total value do not surpass the maximum value, storing the payment transaction on the mobile device. If the number of stored transactions surpasses the maximum number, rejecting the payment transaction. If the number of stored transactions does not surpass the maximum number and the value of the payment transaction or the total value surpass the maximum value, further comprising: sending a request to proceed to a user interface of the mobile device; receiving input through the user interface; storing the payment transaction if the input includes an approval of the request to proceed; and rejecting the payment transaction if the input includes a denial of the request to proceed. The payment transaction is encrypted using a key before the storing, where the key is obtained from a payment service system. Storing the payment transaction includes storing a time or user session data of the transaction. Determining whether the mobile device has a connection to the external network after an interval of time. The external network is an Internet network. The already stored transactions are obtained from an internal database. The risk factors include prior transactions or analysis of the prior transactions. The risk factors are updated by a payment service system when the mobile device has a connection to the external network. The risk heuristic model is updated by a payment service system when the mobile device has a connection to the external network.

Advantages may include one or more of the following. A customer can conduct a point-of-sale electronic payment transaction with a merchant using a mobile device even if the mobile device does not have an Internet connection to immediately process the electronic payment transaction. This allows the merchant to conduct more business with customers without worrying about maintaining a constant Internet connection to a credit card processor. A maximum number of delayed transactions and a maximum value of a delayed transaction can also be established to limit risk to a payment service or to the merchant.

DETAILED DESCRIPTION

Figure 1:
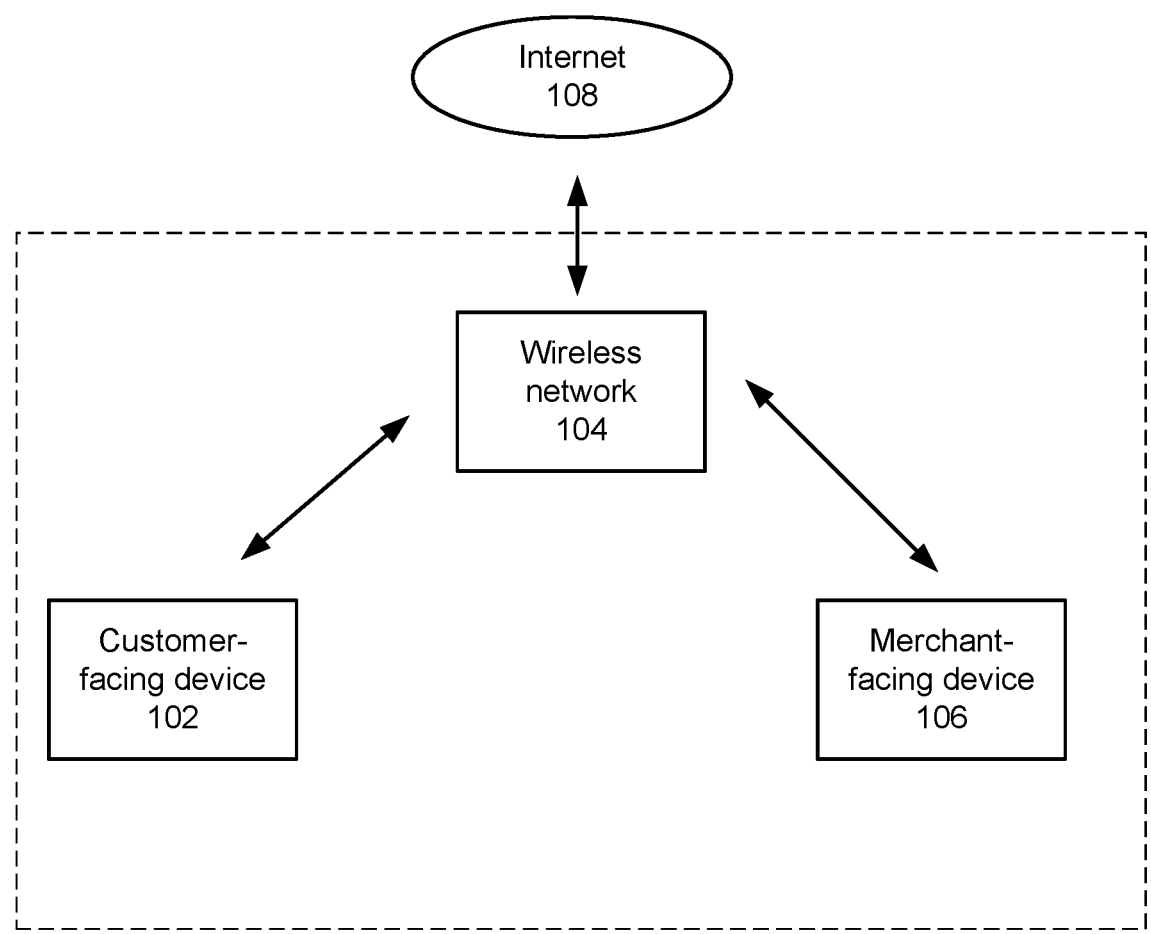
FIG. 1 is a schematic illustration of an example system for communication between mobile devices over a wireless network.

FIG. 1 is a schematic illustration of an example system 100 for communication between mobile devices over a wireless network. The system 100 shown in FIG. 1 is an example of a system that can be configured to establish secure communication between mobile devices over a wireless network using a pairing process in conjunction with a comparison of public keys. The secure communication is described in U.S. patent application (Ser. No. 13/353,238), filed on Jan. 18, 2012, entitled "MOBILE CARD PROCESSING USING MULTIPLE WIRELESS DEVICES," which is incorporated by reference herein in its entirety.

The system 100 includes a first mobile device 102 and a second mobile device 106 that can communicate over wireless network 104. The system 100 can also include additional mobile devices. The system 100 and the wireless network 104 can be connected to an external network, e.g., the Internet 108. For example, the wireless network 104 can be a WiFi hot spot that includes a wireless access point for wireless connection to the mobile devices 102 and 106. The wireless network 104 can also include a wired or cellular, e.g., 3G or 4G, connection the Internet 108. Alternatively or in addition, one or both of the mobile devices 102, 106 could have a wireless connection to the Internet, e.g., over a cell network. However, the Internet 108 is not needed for the two devices 102 and 106 to establish secure communications. The two devices 102 and 106 can establish secure communication solely through the wireless network 104. Establishing secure communications through a pairing process and a comparison of public keys can be implemented with more than two devices.

In some implementations, described further below, the first device 102 serves as a customer-facing device, and the second device 106 serves as a merchant-facing device 106. A "customer facing" device is a device that is configured with applications to display messages to and receive input from the customer. For example, the customer facing device can display a total for a transaction, display an interface for the customer to set a tip, and display a message that a credit card should be swiped. A "merchant facing" device is a device that is configured with applications to display messages to and receive input from the merchant. For example, the merchant facing device can display an interface for the merchant to enter a transaction, calculate a total amount due for the transaction, and display an interface for the merchant to request that the transaction be submitted for authorization.

Figure 2:
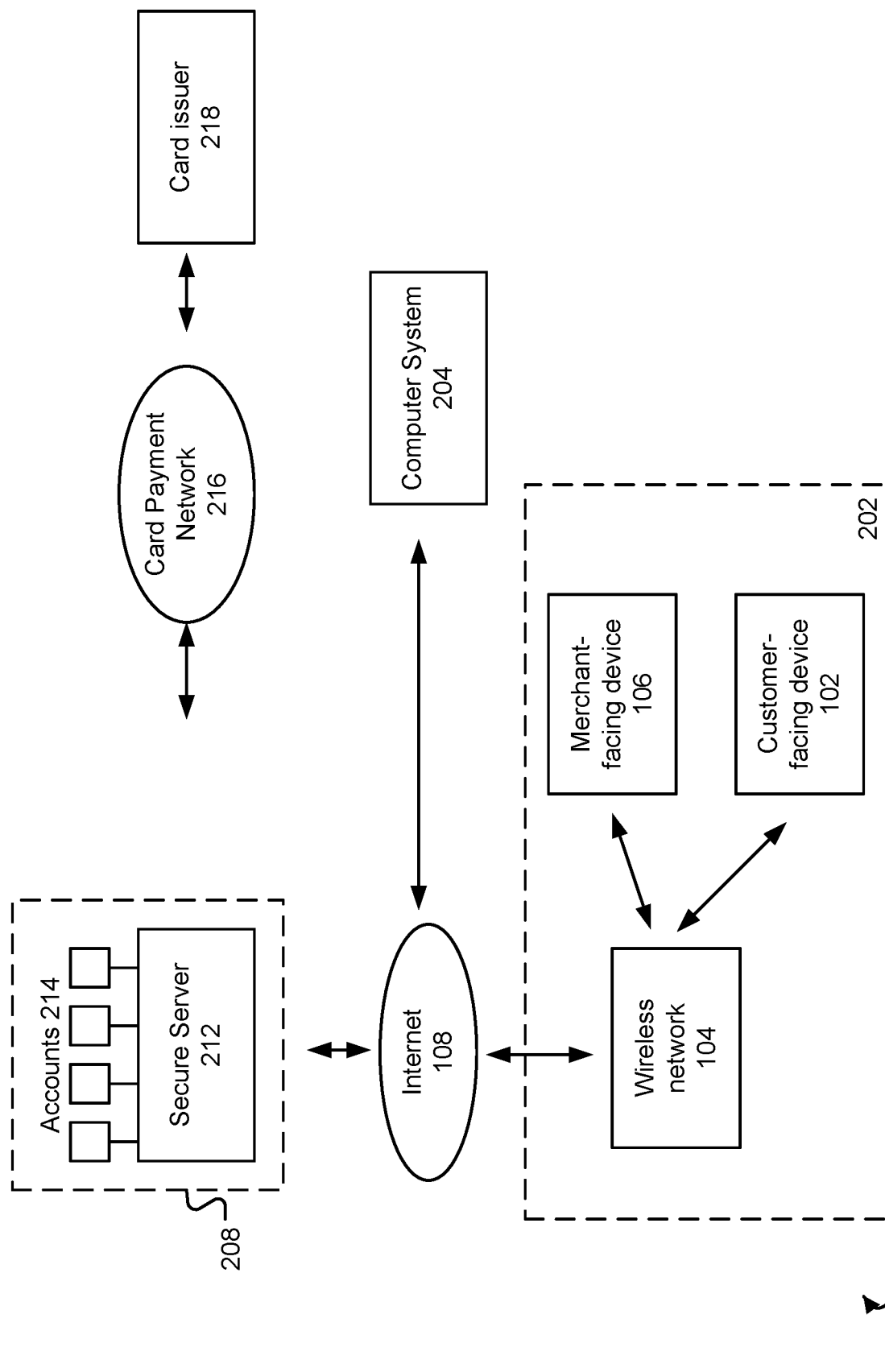
FIG. 2 is a schematic illustration of an example system for processing distributed payment transactions.

FIG. 2 is a schematic illustration of the architecture 200 of an example system for processing distributed payment transactions. The system 200 includes a wireless payment system 202. The wireless payment system 202 includes multiple devices, e.g., a customer facing device 102 and a merchant facing device 106, connected to the wireless network 104. The wireless network 104 is connected at least intermittently to an external network 108, e.g., the Internet. The wireless network 104 can be a wireless access point. In some implementations, the wireless network 104 is a Wi Fi hotspot.

The system 100 or the system 300 can be used in implementing the wireless payment system 202. The customer facing device 102 can be implemented using the first device 102, but with additional programming to enable the device for use in the distributed payment transaction. Similarly, the merchant facing device 106 can be implemented using the second device 106, but with additional programming to enable the device for use in the distributed payment transaction. The wireless network 104 can be implemented using the wireless network 104.

In some implementations, devices connected to the wireless network 104 can securely communicate with each other, e.g., through a process of establishing secure communication as described above. In particular, once secure communication is established, the devices connected to the wireless network 104 can securely communicate with each other without data passing through the external network 108, e.g., through the Internet.

The customer facing device 102 can be a mobile computing device, i.e., a hand held computing device, capable of running a customer-facing portion of a merchant application. For example, the customer facing device 102 can be a smart phone, tablet computer, laptop, or other data processing apparatus. The customer facing device 102 can include a display, e.g., a touch screen display. In some implementations, the customer facing device 102 and the display are two devices connected to each other.

The customer facing device 102 can include or be attached to a credit card reader. For example, the card reader can be attached to an input, e.g., an audio jack, of the customer facing device 102.

The merchant facing device 106 is also a mobile computing device, capable of running a merchant-facing portion the merchant application. For example, the merchant facing device 106 can be a smart phone, tablet computer, laptop, or other data processing apparatus. The merchant facing device 106 can also include a display, e.g., a touch screen display. In some implementations, the wireless payment system 202 includes more than one customer facing device or more than one merchant facing device.

In some implementations, the merchant application has a login and logout functionality such that multiple merchants, each having a separate account with the payment service system 208, can use the same device 106 for processing distributed payment transactions. The functionality allows a driver to login and logout of the payment service system 208. Association by the payment service system 208 of the device 106 with the appropriate merchant account can be done by conventional login techniques.

In some implementations, the system 200 includes a computer system 204 connected to the network 108. The computer system 204 can process or store data related to the transaction for analysis by the merchant or another third party that has a right to the data related to the transaction. For example, the merchant can be a franchisee and the third party can be the franchisor. As another example, the third party can be responsible for coordinating jobs between various merchants who are themselves independent contractors, e.g., the merchant can be a taxi driver and the third party can be a dispatcher.

When a merchant submits a transaction to the payment service system 208, the transaction can include sufficient information, e.g., the name or id number of the merchant, to associate the merchant with the third party. The payment service system 208 can maintain a database associating merchants with third parties, and when the payment service system 208 receive this information, it can identify the associated third party from the information. This allows the payment service system 208 to send data about transactions to the computer system 204 of the associated third party.

For example, if the system 200 is implemented in a restaurant, a customer can pay a restaurant using the wireless payment system 202 after a waiter at the restaurant brings the customer the final tab of the meal. After conducting the transaction, the system can send data about the meal to a computer system 204, e.g., a meal tracking system. The data can include which items were ordered, the cost of the meal, the tip included, the date and time of the meal, or which waiter served the customer.

In some implementations, the customer facing device 102 receives transaction details from the merchant facing device 106 and displays the details on the display of the merchant facing device 106. In particular, the merchant facing device 106 can calculate an amount for the transaction, e.g., based on purchase of individual items, and the amount can be sent to the customer facing device 102 and displayed.

The wireless payment system 202 can communicate with a payment service system 208 using the network 108.

In some implementations, the merchant facing device 106 receives transaction details from the customer facing device 102 and communicates with the payment service system 208 to submit a request for authorization of the transaction. In particular, when the customer swipes the card through the card reader, the card information can be sent to the merchant facing device 106. Similarly, a signature, PIN, or other data required for authorization of the transaction can be input by the customer into the customer facing device 102, e.g., entered on the touch screen display, and this data can be sent to the merchant facing device 106.

In some implementations, the customer facing device 102 does not send transaction details to the merchant facing device 106. Instead, the customer facing device 102 receives the amount for the transaction from the merchant facing device 106, and receives the card information from the card reader when the customer swipes the card. The customer facing device 102 communicates with the payment service system 208 to submit a request for authorization of the transaction.

The payment service system 208 includes a secure server 212 to processes all transactions from the wireless payment system 202. The secure server 212 handles secure information such as credit card numbers, debit card numbers, bank accounts, user accounts, user identifying information or other sensitive information.

The payment service system 208 can communicate electronically with a card payment network 216, e.g., Visa, Mastercard, or the like. The payment service system 208 can communicate with a card payment network 216 over the same network 108 used to communicate with the wireless payment system 202, or over a different network. The computer system 216 of the card payment network can communicate in turn with a computer system 218 of a card issuer, e.g., a bank. There can also be computer systems of other entities, e.g., the card acquirer, between the payment service system 208 and the card issuer.

Before a transaction between the user and the merchant can be performed using the wireless payment system 202, the merchant must create a merchant account with the payment service system 208. The merchant can sign up using a mobile application or using an online website, and can use a device within the wireless payment system 202 or another computing device, e.g., a home computer. At some point prior to the transaction, one or more applications are downloaded to the devices within the wireless payment system 202, e.g., a merchant facing device and a customer facing device. The merchant facing and customer facing devices may run the same application or customized applications to each device (e.g. a merchant application and a customer application). In some implementations, the applications are downloaded through an application store. Creation of the merchant account can be handled through the application, or through another application, e.g., a generic web browser. The merchant enters a name, account password, and contact information, e.g., email address, and physical location information (if applicable), e.g., an address, into the payment service system 208. The merchant can also provide other information, e.g., a list of goods or services available, operating hours, phone number, a small identifying image logo or mark, to the payment service system 208. The data associated with the merchant account 214 can be stored at the secure server 212, e.g., in a database. In some implementations, the merchant can provide information sufficient to establish communication with the computer system 204 and this information can be stored in the payment service system 208.

Eventually, in order to receive funds from the transaction, the merchant will need to enter financial account information into the payment service system 208 sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the payment service system 208 can hold the received funds until the financial account information is provided.

Figure 3:
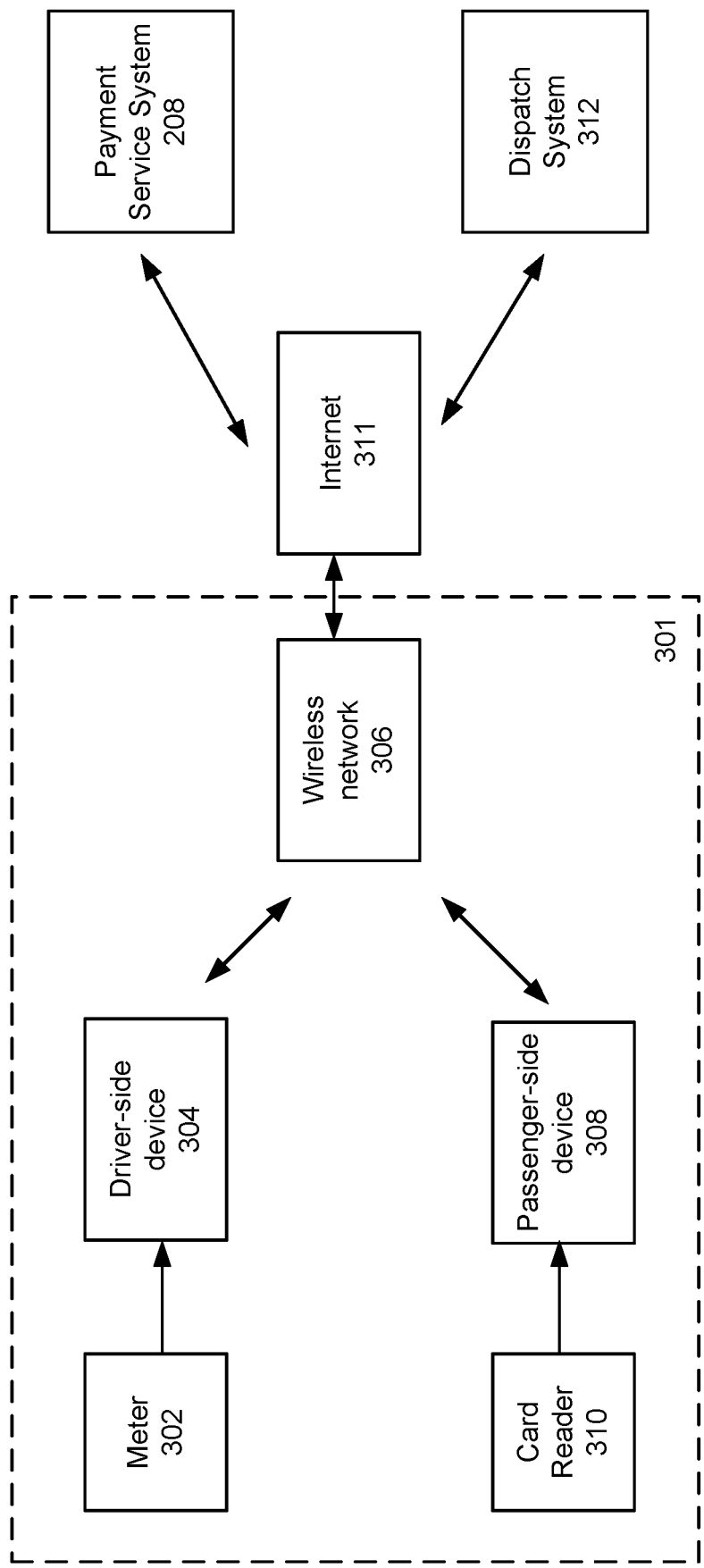
FIG. 3 is a schematic illustration of an example wireless payment system implemented for a taxi.

FIG. 3 is a schematic illustration of a wireless payment system implemented in a taxi environment. The wireless payment system 301 includes a meter 302, a mobile driver side (i.e., merchant facing) device 304, a passenger side (i.e., customer facing) device 308, a card reader 310, and the wireless network 306. The wireless network 306 can include wireless access point mounted in the vehicle that provides a WiFi hot spot. The wireless network 306 can include a transceiver that provides a cellular connection, e.g., 3G or 4G, to the external network 306.

In some implementations, the driver side device 304 is physically connected to the meter 302, e.g., by a data cable, such as a USB cable. The driver side device 304 can be positioned next to the taxi driver in the front of the taxi. The driver side device 304 is wirelessly connected to the wireless network 306. The driver side device 304 can be a smart phone or tablet computer having a display onto which the driver has loaded an appropriate application. The driver side device 304 can also display a passenger fare for the taxi ride.

The passenger side device 308 can be positioned in the back of the taxi where a customer can interface with the device. For example, the passenger side device 308 can be affixed to the back of the front seat of the taxi, or to the back of the barrier separating the driver compartment from the passenger compartment. The card reader 310 is attached to an input, e.g., an audio jack, of the passenger side device 308. The passenger side device 308 is wirelessly connected to the wireless network 306. The passenger side device 308 can be a tablet computer onto which an appropriate application has been loaded. As a tablet computer, the passenger side device 308 includes a display, e.g., a touch screen display.

In some implementations, the driver application has a login and logout functionality such that multiple taxi drivers, each having a driver account, can use the same device 304 for processing distributed payment transactions. The functionality allows a driver to login and logout of the payment service system 208. Association by the payment service system 208 of the device 304 with the appropriate driver account can be done by conventional login techniques.

The driver side device 304 can read data from the meter 302, e.g. fare of a trip, while the passenger side device 308 can read card data, i.e., card information such as the card number, or cardholder name, from the card reader 310. The wireless payment system 301 can communicate with the payment service system 208 over the external network 311, e.g., the Internet.

The wireless payment system 301 can also communicate with a computer system 312, e.g., a dispatch system, of a dispatcher. The computer system 312 can process or store data about taxi rides, as discussed below.

In the taxi environment, when a driver submits a transaction to the payment service system 208, the transaction can include sufficient information, e.g., the name or id number of the driver, to associate the driver with the dispatcher. The payment service system 208 can maintain a database associating drivers with dispatchers, and when the payment service system 208 receive this information, it can identify the associated dispatcher from the information. This allows the payment service system 208 to send data about the taxi ride to the computer system 312 of the associated dispatcher.

For example, if the system 200 is implemented in a taxi, a customer can pay a taxi driver using the wireless payment system 202 after the taxi driver brings the customer to the customer's destination. After conducting the transaction, the system can send data about the taxi ride to a computer system 204, e.g., the computer system of the dispatcher. The data can include a start location and an end location of the taxi ride, the duration of the trip, the distance of the trip, the date and time of the trip, total cost of the trip (e.g., passenger fare and tip), or which taxi cab performed the service.

Figure 4:
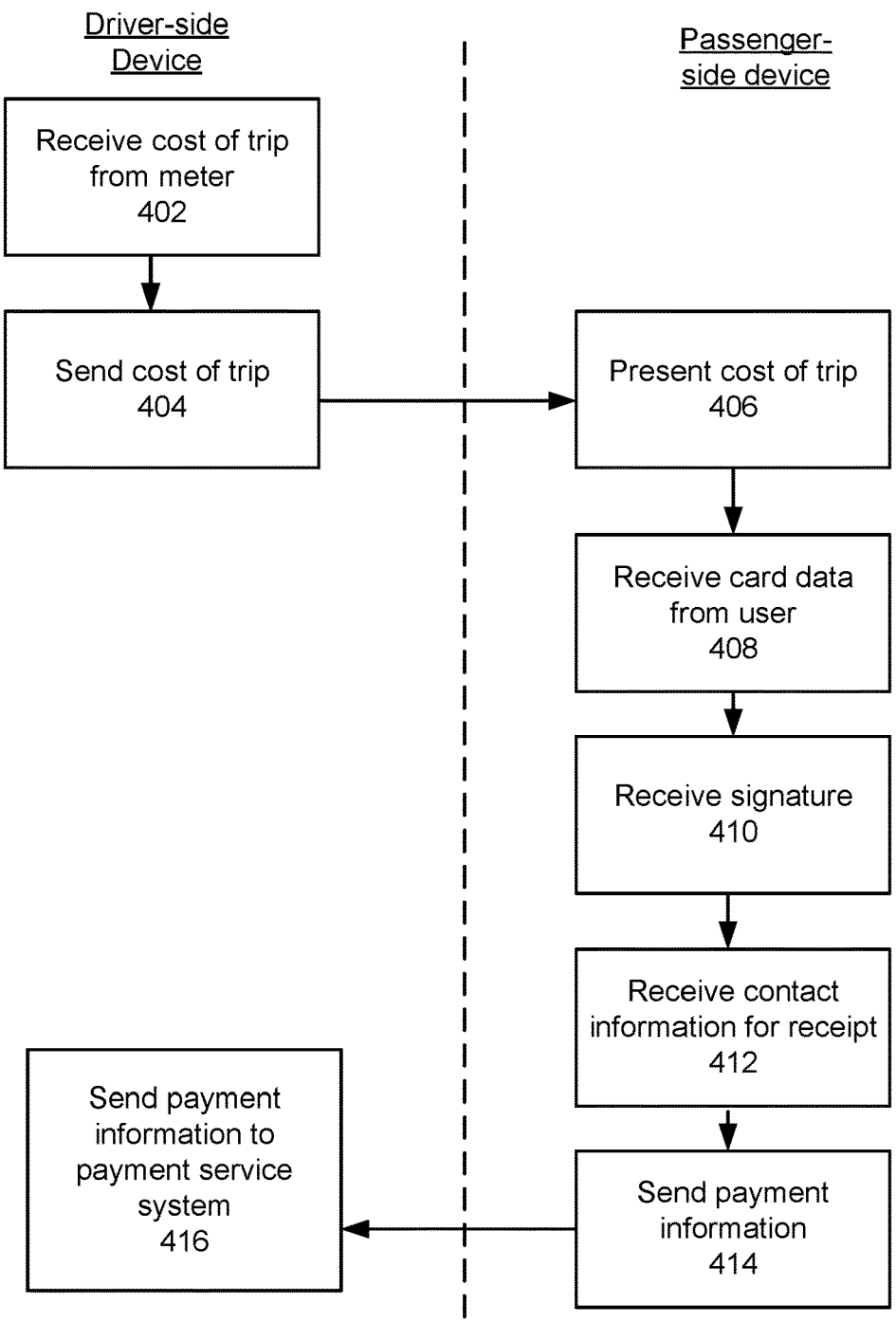
FIG. 4 is a flow chart of an example process conducted with the wireless payment system.

FIG. 4 is a diagram of an example flow chart of a process 400 conducted with the wireless payment system 102 implemented in a taxi environment. For example, a customer can enter a taxi and ask a taxi driver to take the customer to a destination. The taxi driver starts a meter that determines the fare of the trip based at least on the distance and duration of the trip. In some implementations, when the driver starts the meter, the meter generates a signal that is sent to the driver side device indicating that the ride has started.

Once the taxi driver arrives at the destination, the taxi driver stops the meter, which causes the meter to finalize the fare of the trip. The driver side device then receives the amount of the fare of the trip from the meter (step 402). The driver side device can send the amount of the fare of the trip to the passenger side device (step 404). In some implementations, the driver side device sends the amount of the fare to the passenger side device after receiving a signal from the meter (e.g., the driver stops the meter) indicating an end of the trip.

Once the passenger side device receives the amount of the fare of the trip through the wireless network, the passenger side device can display the amount of the fare of the trip (step 406) to the customer. The customer can pay by swiping a card through the card reader attached to the passenger side device. The passenger side device can receive card data, e.g., the card number, from the card reader (step 408). In some implementations, the passenger side device can receive card data from a customer that manually inputs in a card number, e.g., using the touch screen of the passenger side device. After receiving card data, the passenger side device can optionally display a request for a signature and receive a signature approving the transaction (step 410). The passenger side device can display a request to enter a tip amount, and can receive passenger input selecting a tip amount. The passenger side device can calculate a total transaction amount (the fare plus the tip) and display the total transaction amount. The passenger side device can also receive contact information for a receipt (step 412). The passenger side device can receive this information through customer input into the passenger side device, e.g., through a graphical user interface on the touch screen display.

In some implementations, the passenger side device initiates the request for authorization of the transaction. In this case, the passenger side device sends the payment information, which includes at least the transaction amount and the card data (e.g., the card number), but may also include the signature and contact information, directly to the payment service system, e.g., using an Internet connection.

In some implementations, the driver side device initiates the request for authorization of the transaction. In this case, the passenger side device sends the payment information, including at least the card data received from the card reader, to the driver side device (step 414). The signature, tip amount or total transaction amount, and contact information can also be sent to the driver side device. The driver side device can then send the payment information to the payment service system (step 416/806), e.g., using an Internet connection.

In some implementations, neither the driver side device nor the passenger side device has access to an external network connection, e.g., an Internet connection. That is, because the mobile device cannot connect to the payment service system using an Internet connection, the request for authorization cannot be initiated at the end of the trip, e.g., when the customer is about to pay using a credit card and leave the taxi. Instead, the mobile device can store the transaction and process the transaction later. Processing the transaction later can be accomplished by forwarding the transaction to the payment service system when the mobile device reestablishes an Internet connection.

In order to encourage merchants that are likely to enter areas without an external network connection, e.g., taxis, to use the payment system 200, the payment service may decide to cover some transactions (i.e., pay the merchant) even if the transactions are not approved.

Figure 5:
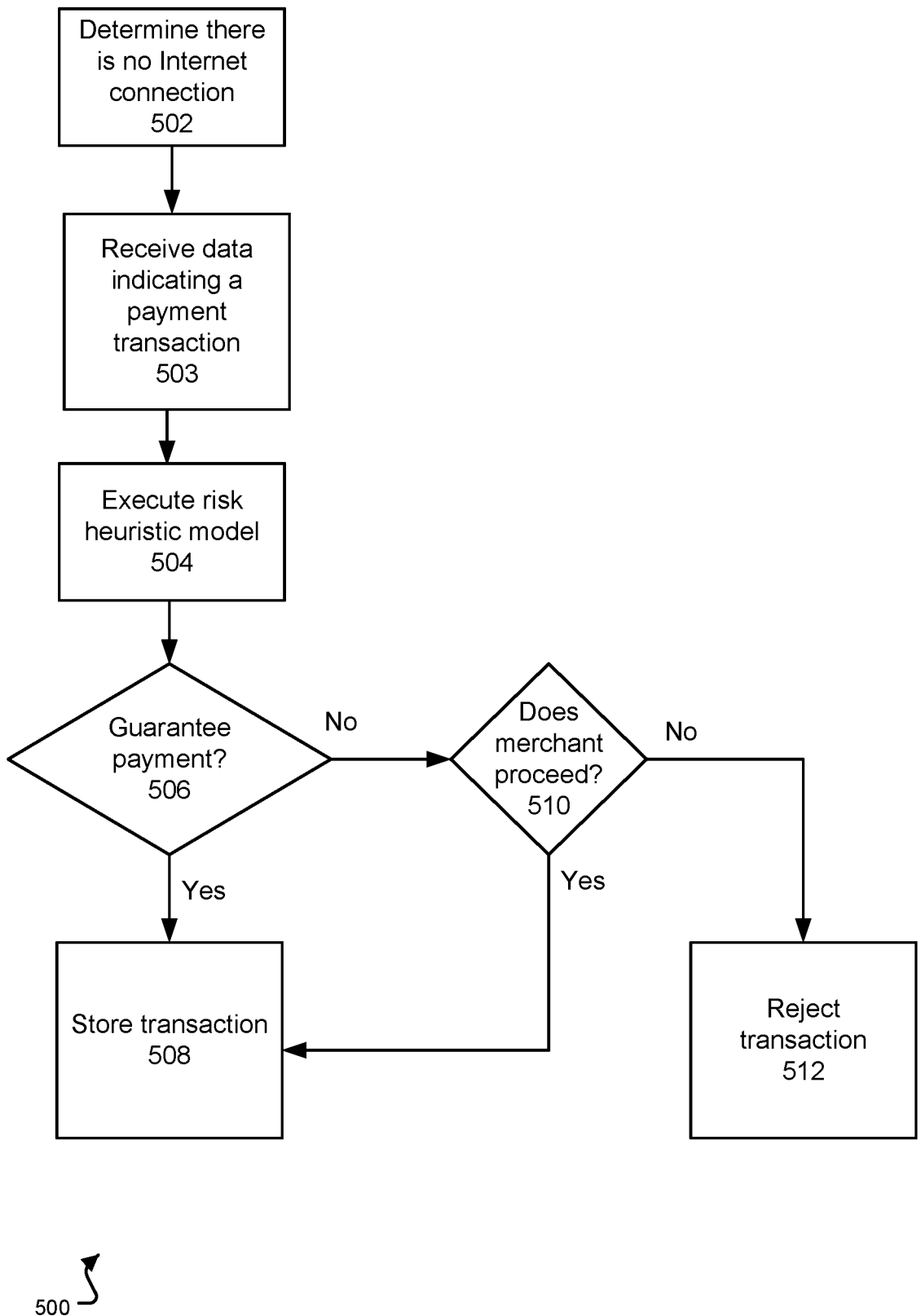
FIG. 5 is a flow chart of an example process of storing a payment transaction.

FIG. 5 is a diagram of an example flow chart 500 of storing a payment transaction. The mobile device, e.g., a merchant device, e.g., the merchant-facing device, determines there is no connection to an external network, e.g., the Internet (step 502). The mobile device can test whether a connection can be made to a resource, e.g., a web page, located on the external network. There may be no cellular Internet connection in areas with poor cellular data reception or with too many cellular data connections concentrated in one area.

The mobile device receives data indicating a payment transaction (step 503). For example, a merchant facing device can receive, over a WiFi network, the data from a customer facing device, which receives data from a user swiping a card at a card reader attached to the mobile device.

The data can include payment information, a signature, a tip amount, or a total transaction amount as described above in reference to FIG. 4.

The mobile device can execute a risk heuristic model to determine whether the payment service covers a transaction (step 504). The risk heuristic model can use a number of already stored transactions, a value of the proposed stored transaction, and/or a total value for all stored transactions in evaluating the risk and determining whether the payment service will cover the transaction. For example, the risk heuristic model can compare a number of already stored transactions, a value of the proposed stored transaction, and/or a total value for all stored transactions to, respectively, a maximum number of stored transactions, a maximum individual value for an individual stored transaction, and a maximum total value for all stored transactions. Where the number or value exceeds the maximum, the mobile device can determine that the payment service will not cover the transaction. These numbers, values, and their respective maximums can be stored on a mobile device, e.g., in an internal database.

The risk heuristic model can also use risk factors associated with a cardholder of the mobile device. For example, the risk factors can include prior transactions or analysis of the prior transactions. In some implementations, when there is a connection, e.g., prior to a store and forward transaction, the payment service system sends the risk factors to the mobile device, e.g., whenever the payment service system determines new or updated risk factors. Therefore, the mobile device can update its risk heuristic model to consider the risk factors.

The risk heuristic model can be dynamically modified by the payment service system. For example, the maximum number of stored transactions or the maximum value of a payment transaction can be modified through a communication, e.g., in the background when there is an Internet connection, with the payment service system. Some risk factors can also be updated to weigh more than others.

The mobile device can determine whether the payment service system will guarantee payment to the merchant based on the risk heuristic model (step 506). If payment will be guaranteed, the mobile device stores the transaction for future processing (step 508). If the payment will not be guaranteed, e.g., the risk heuristic model deems the transaction as too risky, the mobile device prompts the merchant for an approval to proceed (step 510). That is, the mobile device indicates to the merchant, e.g., using a user interface of the device, that the transaction will not be covered if the transaction is denied upon future processing. Thus, the merchant will be taking a risk of non-payment if the transaction is denied upon future processing. If the merchant approves, the mobile device stores the transaction (step 508). If the merchant does not approve, the mobile device rejects the transaction (step 512). Steps 506-512 will be described further below in reference to FIG. 6.

Figure 6:
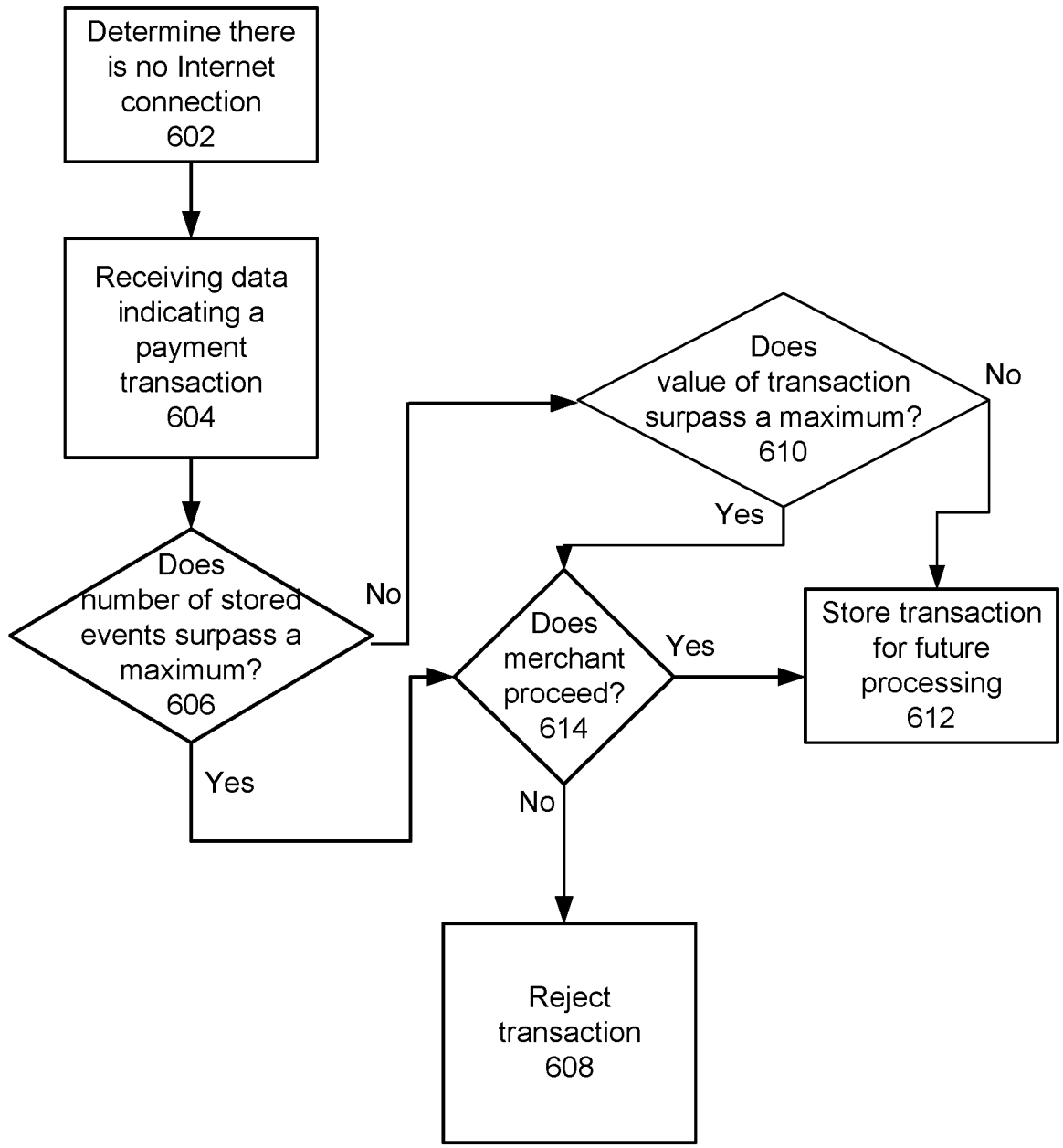
FIG. 6 is a flow chart of an example process of storing a payment transaction using an example risk heuristic model.

FIG. 6 is a diagram of an example flow chart 600 of storing a payment transaction using an example risk heuristic model. The example risk heuristic model considers a number of already stored transactions, a value of a proposed transaction, and a total value of previously stored transactions and does not consider risk factors. In some other implementations, a different combination or subcombination of the above considerations, e.g., including or excluding the risk factors, are used for the risk heuristic model.

The mobile device can determine there is no connection to an external network and receive data indicating a payment transaction (steps 602/604), as described above in reference to FIG. 5.

The mobile device determines whether a number of already stored transactions surpass a maximum number of stored transactions (step 606). The maximum number of stored transactions can be established to limit the number of times a mobile device can store a transaction for future processing. If the number of stored transactions surpasses the maximum number, the mobile device prompts the merchant for approval (step 614), which will be described further below. In some implementations, determining whether the number of stored transactions surpasses the maximum number is an optional step.

If the number of stored transactions does not surpass the maximum number, the mobile device determines whether the value of the proposed payment transaction surpasses the maximum value for the individual stored transaction and/or whether the total value of the proposed payment transaction plus the value of the already stored transactions exceeds the maximum total value for all stored transactions (step 610). The value of the payment transaction can be obtained from the data indicating the payment transaction. If the value of the proposed payment transaction surpasses the maximum individual value, or if the total value of the proposed payment transaction plus the value of the already stored transactions exceeds the maximum total value, the mobile device displays a message that the merchant will be taking the risk of non-payment if the transaction is not approved, and request merchant approval before proceeding (step 614). The merchant can approve or deny the request, e.g., through a user interface of the mobile device. If the merchant approves the request, the mobile device stores the transaction for future processing (step 612), e.g., in an internal database. An indication that the transaction was one which exceeded a maximum can be stored in the internal database.

In some implementations, the mobile device encrypts the transaction, e.g., using a key or a signature on the mobile device, before storing the transaction. The key can be obtained from the payment service system. The key can also be short lived and discarded after a single use. For example, after the mobile device uploads a collection of stored transactions, the payment service system can provide the mobile device with a new key. If the merchant denies the request, the mobile device rejects the transaction (step 608). A notification of the rejection of the transaction can be sent to a user interface of the mobile device.

In some implementations, when the mobile device stores the transaction, the mobile device includes storing a time or user session data of the transaction. The time or user session data can identify the merchant associated with the transaction. For example, in a taxi environment, if a first taxi driver changes shifts with a second taxi driver, comparing a time of a stored transaction with a time of the shift change can indicate which taxi driver should be associated with the stored transaction. Similarly, the second taxi driver can sign in using a respective personal account on the mobile device. This starts a new user session between the mobile device and the second taxi driver. As a result, subsequent stored transactions will be associated with the second driver.

Once the mobile device stores the transaction, the mobile device can increment the number of stored transactions, e.g., in an internal database. In some implementations, the number of stored transactions is reset after all stored transactions are forwarded to a payment service system. In alternative implementations, the number of stored transactions is decreased when one or more stored transactions are forwarded.

Figure 7:
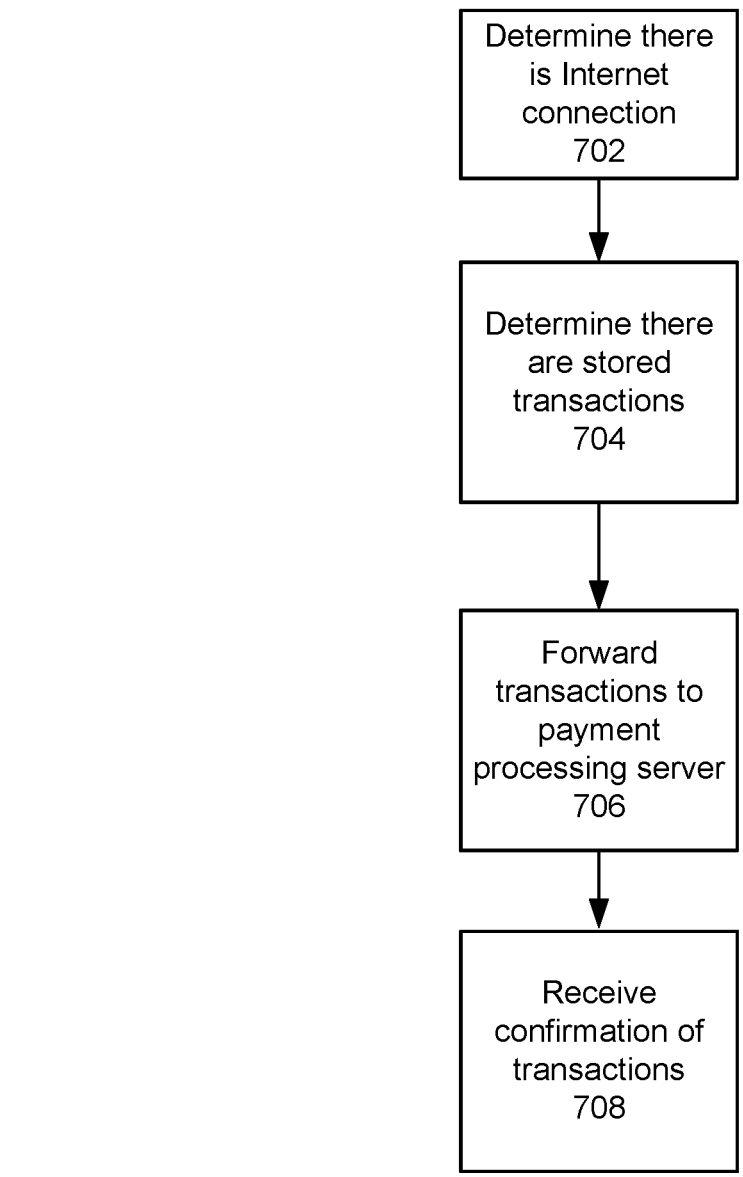
FIG. 7 is a flow chart of an example process of forwarding a payment transaction.

FIG. 7 is a diagram of an example flow chart 700 of forwarding a payment transaction. The mobile device, e.g., a merchant device, can periodically determine whether the mobile device can access an external network, e.g., the Internet. This determination can occur during, before, or after a transaction. For example, the mobile device can ping a resource every few minutes or through an exponential backoff algorithm. If the mobile device eventually determines it can access the Internet (step 702), the mobile device determines whether there are stored transactions on the mobile device (step 704). If there are stored transactions that have not yet been forwarded, the mobile device forwards each transaction to a payment service system for processing (step 706), e.g., using the reestablished Internet connection. In some implementations, the stored transactions are batched and sent to the payment service system for processing. Processing forwarded transactions by a payment service system can occur as described below above in reference to FIGS. 8A-B. Once the forwarded transactions are processed, the mobile device can receive a response for each transaction (step 708). The responses can be acceptances or rejections of the respective transactions. The responses can also include receipts for each respective transaction.

Figure 8:
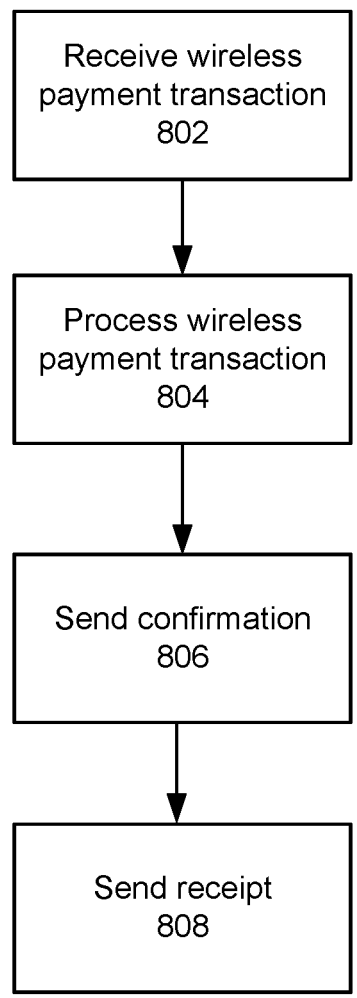
FIG. 8 is a flow chart of an example process conducted by a payment service system. Like reference numbers and designations in the various drawings indicate like elements.

FIG. 8 is a diagram of an example flow chart of a process 800 conducted by a payment service system 208 after receiving a distributed payment transaction from the wireless payment system 102. The payment service system 208 can receive the distributed payment transaction, e.g., a stored transaction, from the wireless payment system (step 802). The distributed payment transaction can include card data, a signature, and other payment information (e.g., payment amount) provided by the customer.

The payment service system 208 then processes the distributed payment transaction (step 804) by sending a record to the computer system of the card payment network 216, e.g., Visa or MasterCard, and the card payment network 216 then sends the record to the card issuer, e.g., the bank, as described above in FIG. 1.

If the transaction is approved and the payment service system 208 receives approval from the card payment network 216, the payment service system 208 communicates this to whichever device (driver side or passenger side) that initiated the request for authorization (step 806). For example, in the case of a stored transaction, the approval can be displayed on the driver side device. The driver side and/or passenger side device then captures the transaction. In the capture stage, the approved transaction is again routed from the capturing device to the card processor, card network and card issuer. The record of the transaction in the capture stage can include the cardholder's signature (if appropriate), or other information. The capture state can trigger the financial transaction between the card issuer and the merchant. On receipt of an indication from the card network that the transaction has been captured, the payment service system 208 optionally creates receipts to send to the customer, e.g., through the customer application and/or through the previously provided contact email, and to the merchant (step 808). For example, if the wireless payment system 202 is implemented in a taxi environment, before signing for the transaction, the customer can input an email address to which the payment service system can send the receipt. Both devices can then display the receipt in each of their applications.

If the transaction is not approved because it would exceed the credit limit or there are insufficient funds in the customer's financial account, the payment service system 208 notifies the application on whichever device (driver side or passenger side) that initiated the request for authorization. For example, in the case of a stored transaction, a notification can be displayed on the driver side device.

As noted above, the payment service may decide to cover some transactions (i.e., pay the merchant) even if the transactions are not approved. In particular, the payment service may determine whether the stored transaction is for an amount less than the maximum individual amount, and/or whether the total amount of all the stored transactions is less than the maximum total amount. If it is, the payment service can pay the merchant for the amount of the stored transaction. However, if the transaction is not approved and the transaction exceeds the individual or total amount, then the payment service system 208 notifies the merchant that the transaction was not approved and that the payment service is not covering the transaction. The message can be sent to whichever device (driver side or passenger side) that initiated the request for authorization.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of wireless payment system may not be limited to a taxi environment but could also be applied to other environments, such as a restaurant. Moreover, usage of the techniques to establish secure communication may not be limited to mobile devices, but could also be applied to non-mobile or wired devices connected to a network. Although the swiping of a card through a reader is described above, other techniques for scanning a card, e.g., chip reading or near field communication, could be used to read data from the card.

Although FIGS. 1 and 2 illustrate a system 200 in which customer-facing and merchant-facing functions are distributed between a first device 102 and a second device 106, the techniques for storing and forwarding transactions are applicable if there is only a single device. In this case the same device provides the customer-facing functions, e.g., displaying a request for the credit card swipe and receiving the card information from the card reader, and the merchant-facing functions, e.g., entering the transaction and calculating a total amount for the transaction.

What is claimed is:

1. A method comprising:
   downloading a first application, provided by a payment service system associated with processing distributed payment transactions, onto a customer-facing device of a payment system;
   executing the first application on an operating system of the customer-facing device;
   downloading a second application, provided by the payment service system, onto a merchant-facing device of the payment system, wherein at least the merchant-facing device is configured to communicate with the payment service system via an external network,
   wherein the first application and the second application (1) are different applications executing on different devices, and (2) are associated with a same merchant account associated with the payment service system, wherein the merchant account is created by the merchant;
   executing the second application on an operating system of the merchant-facing device;
   receiving, via an input device associated with the customer-facing device and by the first application, payment data associated with a payment instrument presented to satisfy a cost of a transaction between the merchant and a customer;
   sending, by the first application via the operating system of the customer-facing device, the payment data to the second application;
   receiving, by the second application via the operating system of the merchant-facing device, the payment data from the first application; and
   sending, by the second application via the operating system of the merchant-facing device, the payment data directly to the payment service system via the external network, wherein receipt of the payment data causes the payment service system to process payment for the transaction.

2. The method as claim 1 recites, wherein the customer-facing device and the merchant-facing device are connected via a wired connection.

3. The method as claim 1 recites, wherein the customer-facing device and the merchant-facing device communicate via a secure wireless connection.

4. The method as claim 1 recites, further comprising, prior to sending the payment data to the payment service system:
   determining, by at least one of the first application via the operating system of the customer-facing device or the second application via the operating system of the merchant-facing device, that the payment service system is not accessible via the external network; and
   storing the payment data on the merchant-facing device until the payment service system is accessible via the external network.

5. The method as claim 4 recites, further comprising, prior to storing the payment data:
   determining, by the second application via the operating system of the merchant-facing device, a risk associated with the transaction;
   determining, by the second application via the operating system of the merchant-facing device and based at least in part on the risk, that the transaction is not approved for the payment by the payment service system if the payment data is not authorized for the cost of the transaction after the payment service system is accessible via the external network; and
   storing the payment data on the merchant-facing device responsive to an input approving storage of the payment data.

6. The method as claim 1 recites, further comprising:
   receiving, by the second application via the operating system of the merchant-facing device, a response from the payment service system, wherein the response indicates an acceptance or a rejection of the payment; and
   presenting, by at least one of the first application via the operating system of the customer-facing device or the second application via the operating system of the merchant-facing device, the response via a display associated with at least one of the customer-facing device or the merchant-facing device.

7. The method as claim 1 recites, wherein the input device comprises a payment instrument reader that is controlled by at least one of the first application or the operating system of the customer-facing device.

8. The method as claim 1 recites, wherein sending the payment data to the payment service system comprises sending, by the second application via the operating system of the merchant-facing device, the payment data via a secure communication over the external network.

9. The method as claim 1 recites, further comprising presenting, by the first application via the operating system of the customer-facing device, at least one of the cost of the transaction, a prompt to provide payment data, or a tip user interface via a display associated with the customer-facing device.

10. The method as claim 1 recites, further comprising presenting, by the second application via the operating system of the merchant-facing device, at least one of information associated with the transaction or an authorization user interface via a display associated with the merchant-facing device.

11. A payment system comprising:
a customer-facing device configured with a first application that is provided by a payment service system and that is executable on an operating system of the customer-facing device to (i) display information to a customer and (ii) receive input from the customer, wherein the customer-facing device includes a payment reader to read payment data from a payment instrument presented in association with a transaction between the customer and a merchant; and
a merchant-facing device configured with a second application that is provided by the payment service system and is executable on an operating system of the merchant-facing device to (i) display information to the merchant and (ii) receive input from the merchant,
wherein the first application and the second application are different applications and are associated with a same merchant account associated with the payment service system, wherein the merchant account is created via interactions between the merchant device and the payment service system, and wherein:
the customer-facing device and the merchant-facing device communicate to generate transaction data associated with the transaction;
the transaction data includes the payment data;
at least the merchant-facing device is configured to communicate with the payment service system via an external network for processing payment for the transaction based at least in part on the transaction data; and
the first application and the second application are associated with an account of the merchant associated with the payment service system.

12. The system as claim 11 recites, wherein the customer-facing device and the merchant-facing device are connected via a wired connection.

13. The system as claim 11 recites, wherein the customer-facing device and the merchant-facing device communicate via a secure wireless connection.

14. The system as claim 11 recites, wherein at least one of the first application is executable by the operating system of the customer-facing device or the second application is executable by the operating system of the merchant-facing device further to determine, prior to sending the transaction data to the payment service system, that the payment service system is not accessible via the external network and wherein the merchant-facing device is further configured to store the transaction data until the payment service system is accessible via the external network.

15. The system as claim 14 recites, wherein the second application is executable by the operating system of the merchant-facing device further to:
determine, prior to storing the transaction data, a risk associated with the transaction;
determine, based at least in part on the risk, that the transaction is not approved for the payment by the payment service system if the payment data is not authorized for the payment after the payment service system is accessible via the external network; and
store the transaction data on the merchant-facing device responsive to an input approving storage of the transaction data.

16. The system as claim 14 recites, wherein the external network is not accessible due to a connectivity issue with the external network.

17. The system as claim 11 recites, wherein the second application is executable by the operating system of the merchant-facing device further to receive a response from the payment service system, wherein the response indicates an acceptance or a rejection of the payment data for the payment and is presented by at least one of the first application or the second application via a display associated with the system.

18. The system as claim 11 recites, wherein the second application is executable by the operating system of the merchant-facing device further to send the transaction data via a secure communication with the external network.

19. The system as claim 11 recites, wherein the first application is executable by the operating system of the customer-facing device further to present at least one of a total amount for the transaction, a prompt to provide payment data, or a tip user interface via a display associated with the customer-facing device.

20. The system as claim 11 recites, wherein the second application is executable by the operating system of the merchant-facing device further to present, at least one of information associated with the transaction or an authorization user interface via a display associated with the merchant-facing device.

* * * * *